Figure 1:
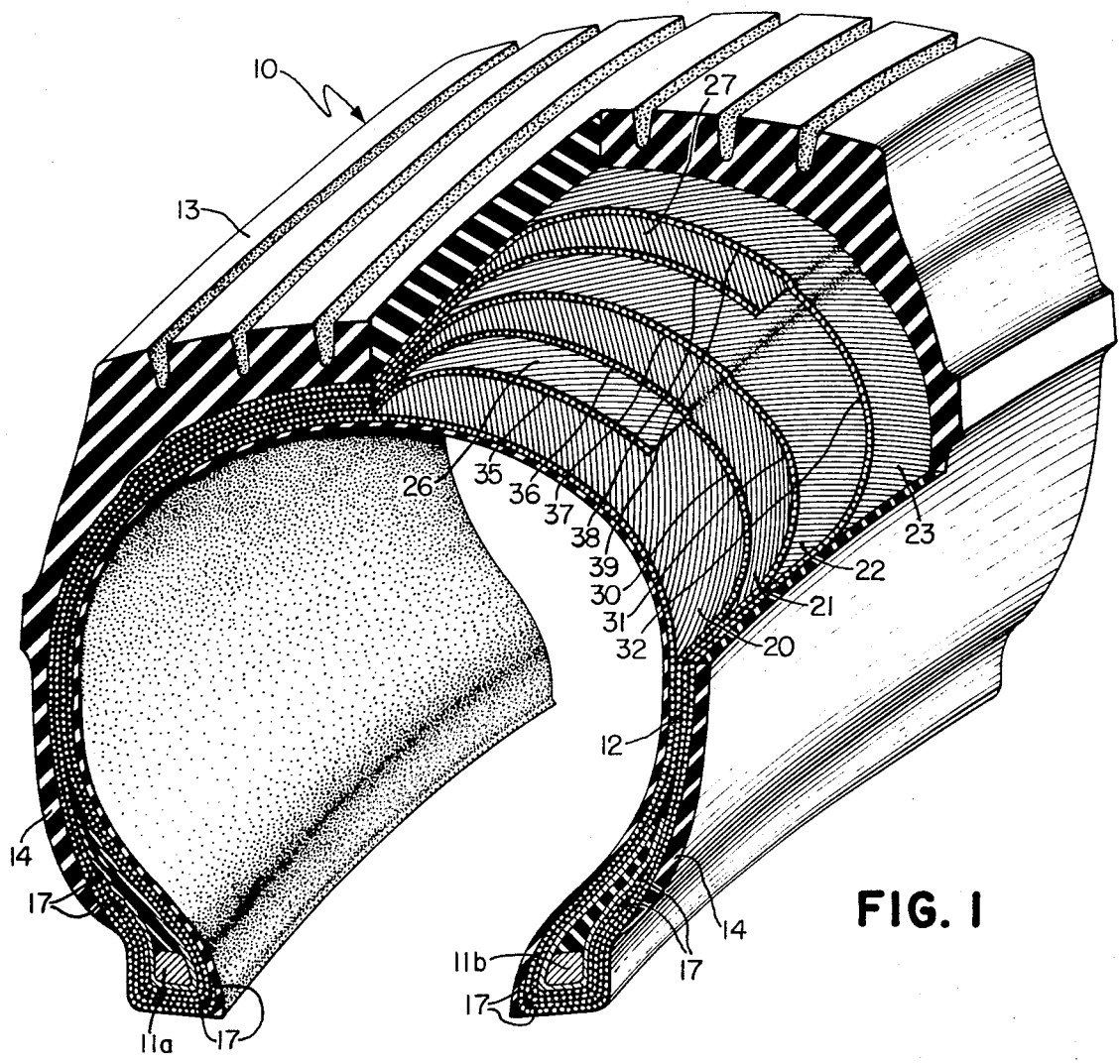

United States Patent

Smithkey, Jr.

[15] 3,685,564
[45] Aug. 22, 1972

[54] PNEUMATIC TIRE

[72] Inventor: John C. Smithkey, Jr., 1271 Overland Ave., North Canton, Ohio 44720

[22] Filed: Nov. 17, 1969

[21] Appl. No.: 877,340

[52] U.S. Cl.............152/356, 152/361, 152/DIG. 19
[51] Int. Cl................................................B60c 9/08
[58] Field of Search.........152/354, 356, 361, DIG. 19

[56] References Cited

UNITED STATES PATENTS

| | | | |
|---|---|---|---|
| 3,205,931 | 9/1965 | Keefe | 152/354 |
| 2,225,042 | 12/1940 | Elliott | 152/356 |
| 2,348,350 | 5/1944 | McKelvey | 152/356 |
| 2,976,905 | 3/1961 | Beckadolph | 152/354 |
| 3,525,377 | 8/1970 | Menell et al | 152/361 |

FOREIGN PATENTS OR APPLICATIONS 869,603    1/1953    Germany..................152/356

Primary Examiner—Arthur L. La Point
Assistant Examiner—Robert Saifer
Attorney—F. W. Brunner and Michael L. Gill

[57] ABSTRACT

A bias-ply pneumatic tire having breaker plies disposed beneath the tread and interleaved among the carcass plies and having special cord angle relationships among the several plies to provide a stiff tread area and flexible sidewall areas.

The foregoing abstract is not to be taken as limiting the invention of this application, and in order to understand the full nature and extent of the technical disclosure of this application, reference must be made to the accompanying drawings and the following detailed description.

8 Claims, 4 Drawing Figures

Patented Aug. 22, 1972  3,685,564

2 Sheets-Sheet 1

INVENTOR.
JOHN C. SMITHKEY, JR.

BY
Michael L. Gill

ATTORNEY

INVENTOR.
JOHN C. SMITHKEY, JR.

PNEUMATIC TIRE

This invention relates to pneumatic tires and in particular to tires having a bias-ply carcass reinforced with breakers or the like in the tread area.

It is an object of this invention to provide a pneumatic tire having a stiff tread area and increased flexibility in the sidewall areas. It is a further object of this invention to provide a tire having improved skid resistance and tread wear, good riding qualities and improved durability and strength.

Figure 3:
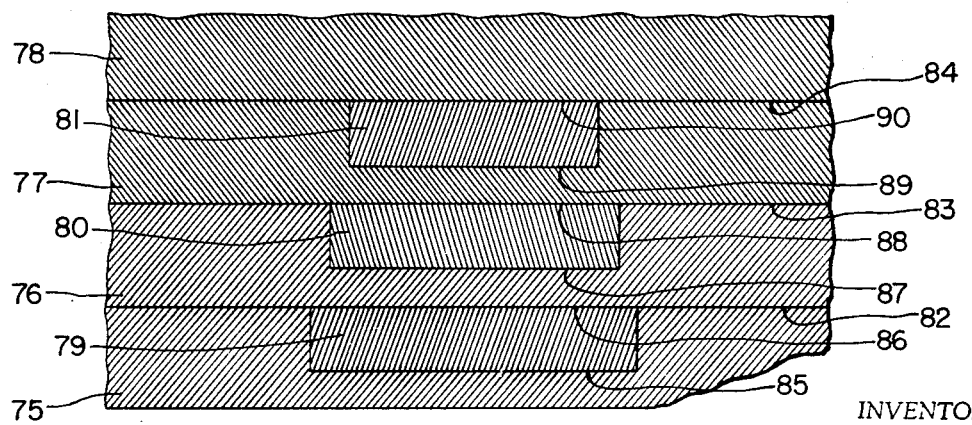
Figure 2:
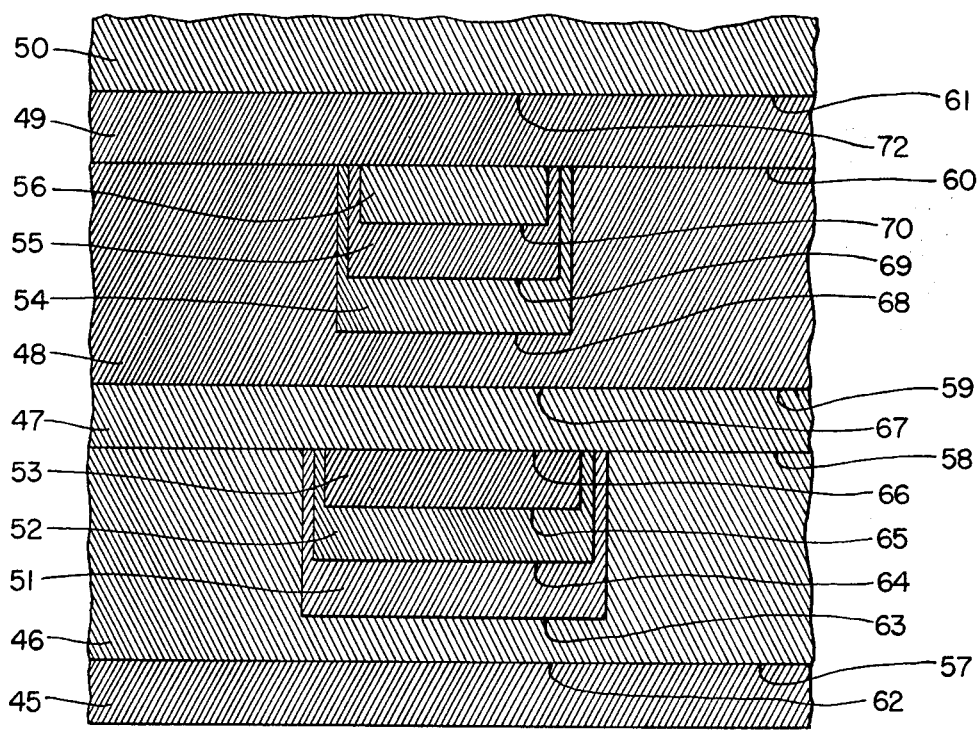
Figure 4:
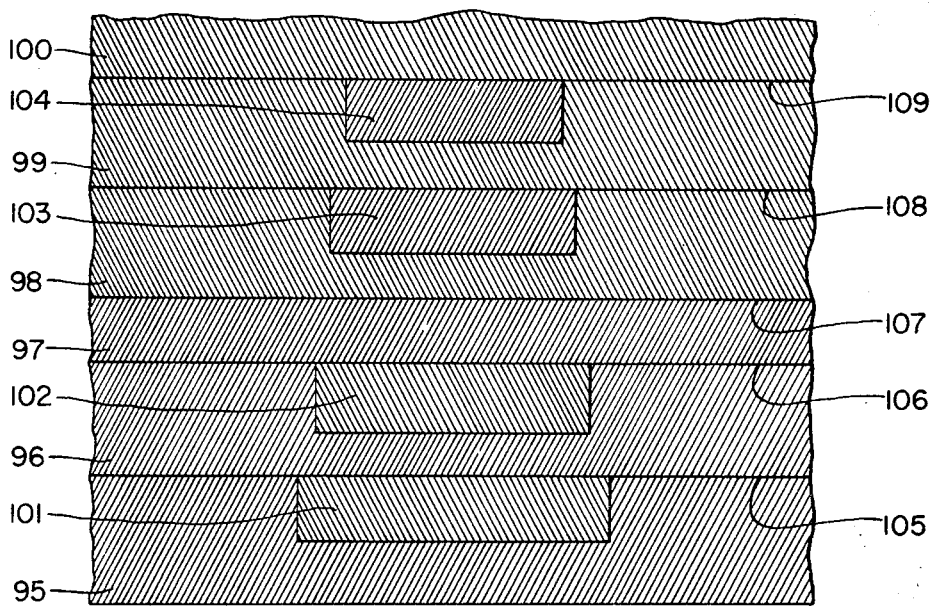

In the drawings:

FIG. 1 is a fragmentary cross-sectional perspective view of a pneumatic tire incorporating the present invention, and FIGS. 2 through 4 are schematic views of the arrangement of tire reinforcing layers illustrating alternate embodiments of this invention.

With reference to the drawings and in particular FIG. 1, a pneumatic tire incorporating this invention is generally indicated at 10 and comprises a pair of spaced apart beads 11a, 11b and a carcass 12 which extends from bead to bead. A tread 13 is disposed over and extends circumferentially about the carcass 12. A pair of sidewalls 14 extend from the beads to the thread 13. The carcass 12 comprises a plurality of reinforcing layers or plies of cord reinforced rubber. The cords in each layer may be of any suitable material such as, by way of example only, rayon, nylon, polyester, fiberglass or metal.

In the embodiment illustrated in FIG. 1, four carcass plies 20, 21, 22 and 23 extend circumferentially of the carcass 12 and from bead to bead. Each carcass ply 20, 21, 22 and 23 has its ends 17 turned around the respective bead 11a or 11b. For the purpose of this invention a "carcass ply" shall be a reinforcing layer or ply of tire cords which extends from at least adjacent one bead 11a to at least adjacent the opposite bead 11b. Also, in the embodiment illustrated in FIG. 1 there are two breaker plies 26 and 27 which extend circumferentially of the tire 10 and are disposed beneath the tread 13. For the purpose of this invention a "breaker ply" shall be a reinforcing layer or ply of tire cord fabric which extends circumferentially of the tire beneath the tread 13 and terminates substantially short of the point of maximum section width of the tire and shall be construed to include belt plies. The section width of the tire is measured parallel to the rotational axis of the tire and from the outside side of the carcass in one sidewall to the outside of the carcass in the other sidewall.

Again, with reference to FIG. 1, each reinforcing layer, whether a carcass ply or breaker ply, is comprised of plurality of tire cords that are substantially parallel within any one reinforcing layer. The carcass plies are arranged with their cords extending at a cured angle of less than 75 degrees with respect to the mid-circumferential centerplane and thus are referred to as bias plies. For purposes of this invention, the "mid-circumferential centerplane" is a plane which passes through the tread surface of the tire mid-way between the lateral edges thereof and is perpendicular to the rotational axis of the tire. In the particular embodiment illustrated, both the carcass plies and the breaker plies had the same uncured cord angle of 57 degrees with respect to the mid-circumferential centerplane. When the tire was shaped and cured the cord angle of the carcass plies was about 29° and the cord angle of breaker ply was about 27°.

Two plies may have their cords extending at angles of equal magnitude with respect to the mid-circumferential centerplane but extending in different directions with respect to the mid-circumferential centerplane, such as carcass plies 21 and 22 in FIG. 1. For purposes of this invention "opposite hand plies" shall mean two plies whose cords extend in opposite directions with respect to the mid-circumferential centerplane or in other words, plies having opposite hand cord angles. The cord angle of a ply is the acute angle which its cords form with the mid-circumferential centerplane of the tire at said centerplane. Also, for purposes of this invention two next adjacent plies whose lesser included angle between the cords of one ply and the cords of the other ply is at least 4° will be considered plies which have their cords crossed with respect to each other. Plies whose lesser included angle between the cords of one ply and the cords of the other ply is less than 4° will be considered plies which have their cords substantially parallel to each other.

More particularly and with reference to FIG. 1, the radially innermost reinforcing layer is a first bias carcass ply 20 which extends from bead to bead with each end 17 turned around the respective bead 11a or 11b to anchor it thereto. Immediately radially outwardly of the first carcass ply 20 is a first breaker ply 26 which is disposed beneath the tread 13 and extends laterally thereof in both directions to the upper portion of the sidewall 14. The first breaker ply 26 is opposite in hand to the first carcass ply 20. Whether or not the breaker ply extends into the upper sidewall area, and if so how far, is a design characteristic which would be determined by the desired tire characteristics and tread width. In any event, the breakers should terminate substantially short of the point of maximum section width.

Immediately radially outwardly of the first breaker 26 is a second carcass ply 21 which has its cords substantially parallel to those in the first carcass ply 20 and again has its inner ends 17 turned around the respective bead 11a or 11b. A third carcass ply 22 is disposed immediately radially outwardly of the second carcass ply 21 and similarly has its inner ends 17 turned around the beads 11a. This third carcass ply 22 has its cords extending at an angle with respect to the mid-circumferential centerplane that is equal and opposite in hand to the angle of the cords in the second carcass ply 21. A second breaker ply 27 is disposed immediately radially outwardly of the third carcass ply 22 and has a cord angle equal but opposite in hand to the cord angle of the third carcass ply 22. Immediately radially outwardly of the second breaker ply 27 is a fourth carcass ply 23 which has its cords extending at an angle that is substantially equal to and opposite in hand to the cord angle in the second breaker ply 27 but is substantially the same as that of the third carcass ply 22. In the embodiment illustrated, the breaker plies decrease in width from the radially innermost first breaker ply 26 to the radially outermost breaker ply 27. It should be noted that the breaker plies need not decrease in width but should be at least stepped off at their lateral edges. This is desirable in order to provide a smooth transition from the stiff tread area to the flexible sidewall area and to avoid an abrupt change in carcass thickness at the lateral edges of the breakers.

It can thus be seen that in the tread area, or the area of the breakers, each reinforcing layer, whether a carcass ply 20, 21, 22 or 23, or a breaker ply 26 or 27, has its cords extending at an angle opposite in hand to that of each next adjacent reinforcing layer. In other words, each of the interfaces 35 to 39 between the plies in the area of the breaker plies has the cords in the next adjacent plies on opposite sides thereof crossed with respect to each other. In the flex area of the sidewalls 14, however, the interface 30 between the plies 20 and 21 and the interface 32 between the plies 22 and 23 each have the cords in the plies on opposite sides thereof substantially parallel to each other while the interface 31 between the plies 21 and 22 have the cords in the plies on the opposite side thereof crossed with respect to each other. For purposes of this invention, "flex area" shall be construed to mean the middle one-third of the sidewall between the beads 11a, 11b and the tread 13. In this embodiment the cord angles of all of the plies are substantially the same. The parallel cord arrangements and crossed cord arrangements are achieved by grouping the same hand plies together and opposite hand plies together respectively.

In summary, all or 100 percent of the interfaces 35 to 39 in the tread area 13 have the cords on opposite sides thereof crossed with respect to each other while only one interface 31 out of three interfaces 30, 31 and 32 in the sidewall flex areas, or 33 ⅓ percent of these interfaces, have the cords crossed on opposite sides thereof. Therefore, in this specific embodiment, the ratio of the percent of interfaces in the tread area having cords crossed on opposite sides thereof to the percent of interfaces in the sidewall area having cords crossed on opposite sides thereof is 100 percent/33 ⅓ percent or 3.0.

This ratio is a measure of the relative stiffness between the tread area and the sidewall area. If this ratio is high, the tread will be very stiff relative to the sidewalls. As the ratio decreases, the stiffness of the tread relative to the sidewalls decreases. This ratio should be greater than 1.0 and preferably at least 1.5 to give a tread area that is significantly stiffer than the sidewalls.

A tire constructed in accordance with the method of this invention possesses many qualities among which are good skid resistance and tread wear, good riding qualities and improved durability and strength. The crossed cord arrangement of the reinforcing layers in the tread area makes the tread area stiff which provides a tire which has good skid resistance and tread wear. The stiff tread area helps to prevent movement of the ribs in the tread as the tread passes through the footprint which results in good resistance. The stiff tread also resists movement of the tread in the footprint which results in improved tread wear. The parallel cord arrangement between some adjacent plies in the sidewall area results in a more flexible sidewall without reducing the sidewall strength or the amount of reinforcing in the sidewall area. It can be seen, therefore, that this novel arrangement of plies to give more crossed cord interfaces in the tread area and less in the sidewall gives the desired result of stiff tread and flexible sidewall in a bias-ply tire. The fact that there are no reinforcing layers or additional components above the radially outermost carcass ply results in a more durable tire in that this helps to reduce the possibility of separation at the lateral edges of the breakers. This lack of components above the radially outermost ply also helps prevent foreign matter or trapped air from getting into this critical area during construction and cause premature failure of the tire.

It can readily be seen by one skilled in the art that as many plies and breakers as are desired could be assembled in a tire carcass in accordance with the scheme of FIG. 1. The carcass plies are arranged in pairs which have their cords substantially parallel. These pairs of carcass plies are arranged with alternating angles such that the interfaces between these pairs have cords crossed on opposite sides thereof. An opposite hand breaker ply is provided between the next adjacent carcass plies of each pair of plies having their cords substantially parallel. The embodiment of FIG. 1, therefore, is merely representative and could include eight, 10, 12 or more carcass plies and four, five or six or more breakers plies according to the scheme illustrated.

In a further embodiment illustrated in FIG. 2, the radially innermost reinforcing layer is a first bias carcass ply 45. A second carcass ply 46 is disposed radially outwardly of the first carcass ply 45 and has its cords extending at opposite angles with respect to the first carcass ply 45. First, second and third breaker plies 51, 52 and 53 are successively disposed radially outwardly of the carcass ply 46 and have their cord angles alternating from the first breaker ply 51 which is opposite in hand to the second carcass ply 46. A third carcass ply 47 is disposed radially outwardly of the third breaker 53, and has its cords substantially parallel to those of the second carcass ply 46 but opposite in hand to hose of the third breaker ply 53. A fourth carcass ply 48 is disposed radially outwardly of and opposite in hand to the third carcass ply 47. Fourth, fifth and sixth breaker plies 54, 55 and 56 are successively disposed radially outwardly of the fourth carcass ply 48 and have their cord angles alternating from the fourth breaker ply 54 which is opposite in hand, to the fourth carcass ply 48. A fifth carcass ply 49 is disposed radially outwardly of and opposite in hand to the sixth breaker ply 56. A sixth carcass ply 50 is disposed radially outwardly of and opposite in hand to the fifth carcass ply 49. Again, in this specific embodiment, the breaker plies successively decrease in width from the radially innermost first breaker ply 51 to the radially outermost sixth breaker ply 56.

Again, in this embodiment each of the interfaces 62 to 72 between the reinforcing layers or plies in the crown area or tread area have the cords crossed on opposite sides thereof with respect to each other. In the sidewall flex areas, however, the second and fourth interfaces 58 and 60 between the second and third, and fourth and fifth carcass plies 46 – 47, 48 – 49, respectively, each has the cords on the opposite sides thereof substantially parallel with respect to each other while the first, third and fifth interfaces 57, 59 and 61 each have the cords on opposite sides thereof crossed with respect to each other. Again, although in the embodiment illustrated the magnitudes of all the cord angles are substantially the same, the only ones that need to be substantially the same are those in next adjacent plies in pairs of plies that have their cords substantially parallel; that is, second and third carcass plies 46, 47 and fourth and fifth carcass plies 48, 49. In this embodiment 100 percent of the interfaces in the tread area have crossed cords on opposite sides thereof, while 60 percent of the interfaces in the sidewalls have crossed cords on opposite sides thereof. This results in a ratio of the percent of crossed cord interfaces (i.e. interfaces that have cords crossed on opposite sides thereof) in the tread area to the percent of crossed cord interfaces in the sidewall area of 1.67.

In another embodiment of this invention illustrated in FIG. 3, the radially innermost reinforcing layer is a bias, first carcass ply 75. A first breaker ply 79 is disposed radially outwardly of the first carcass ply 75 and has its cords extending generally in the same direction as those of the first carcass ply 75 but at a cord angle which is at least 4° different from that of the first carcass ply 75. In other words, the first carcass ply 75 and the first breaker ply 79 are not opposite in hand but at the same time, the cords in one ply are crossed with respect to the cords in the other ply. A second carcass ply 76 is disposed immediately radially outwardly of the first breaker ply 79 and has its cords extending substantially parallel to those in the first carcass ply 75. A second breaker ply 80 is disposed immediately radially outwardly of the second carcass ply 76 and has its cords extending at an angle substantially equal to that of the first breaker ply 79 but opposite in hand. A third carcass ply 77 is disposed radially outwardly of the second breaker ply 80 and has its cords extending at an angle substantially equal to that of the cords in the second carcass ply but opposite in hand. This third carcass ply 77 has its cords extending at an angle which is at least 4° different from that of the next adjacent second breaker ply 80. A third breaker ply 81 is disposed radially outwardly of the third carcass ply 77 and its cords extending at an angle opposite to those of the third carcass ply 77 and the second breaker ply 80 but at an angle with respect to the mid-circumferential centerplane substantially equal in magnitude to that of the second breaker ply 80. A fourth carcass ply 78 is disposed radially outwardly of the third breaker ply 81 and has its cords extending substantially parallel to those of the third carcass ply 77. The breaker plies successively decrease in width from the radially innermost first breaker ply 79 to the radially outermost third breaker ply 81.

Each of the interfaces 85 through 90 in the area of the tread have the cords on opposite sides thereof crossed with respect to each other. The first, second and fourth interfaces 85, 86 and 88 respectively each have an angle between the cords on opposite sides thereof of at least 4 degrees. The rest of the interfaces, third, fifth and sixth, 87, 89 and 90, respectively each have the cords on opposite sides thereof extending at opposite angles with respect to each other resulting in interfaces having cords crossed on opposite sides thereof. The cords on the opposite sides of the first and third interfaces 82, 84 respectively in the sidewall 14 area have cords substantially parallel on opposite sides thereof while the second interface 83 in the region of the sidewall 14 has the cords on opposite sides thereof crossed with respect to each other. In this embodiment, again 100 percent of the interfaces in the area of the tread have cords crossed on opposite sides thereof while 33 ⅓ percent of the interfaces in the sidewall flex areas have cords crossed on opposite sides thereof. This results in a ratio of the percent of crossed cord interfaces in the tread area to the percent of crossed cord interfaces in the sidewall flex area of 3.0.

In a further embodiment of this invention illustrated in FIG. 4, a first breaker ply 101 is disposed radially outwardly of an opposite hand first carcass ply 95. A second carcass ply 96 is disposed radially outwardly of the first breaker ply 101 and has its cords substantially parallel to the cords in the first carcass ply 95. A second breaker ply 102 is disposed radially outwardly of and is of opposite hand with respect to the second carcass ply 96. A third carcass ply 97 is disposed radially outwardly of the second breaker ply 102 and has its cords substantially parallel to the cords in the second carcass ply 96. A fourth carcass ply 98 is disposed radially outwardly of and is of opposite hand with respect to the third carcass ply 97. A third breaker ply 103 is disposed radially outwardly of and is of opposite hand with respect to the fourth carcass ply 98. A fifth carcass ply 99 is disposed radially outwardly of the third breaker ply 103 and has its cords substantially parallel to the cords in the fourth carcass ply 98. A fourth breaker ply 104 is disposed radially outwardly of and is of opposite hand with respect to the fifth carcass ply 99. A sixth carcass ply 100 is disposed radially outwardly of the fourth breaker ply 104 and has its cords substantially parallel to the cords in the fifth carcass ply 99. In this embodiment again all interfaces in the area of the tread 13 have cords crossed on opposite sides thereof. There are five interfaces 105 through 109 in the sidewall flex area and only the third one 107 has cords crossed on opposite sides thereof. The rest of the interfaces 105, 106, 108 and 109 in the sidewall area have the cords generally parallel on opposite sides thereof. This results in a ratio of the percent interfaces in the tread area that have cords crossed on opposite sides thereof to the percent interfaces in the sidewall area having cords crossed on opposite sides thereof equal to 100 percent/20 percent or 5.0.

While in the embodiments illustrated all the breaker plies were interleaved among the carcass plies, it is not intended that the invention be so limited but should be construed to include locating all or part of the breaker plies above or below the radially outermost carcass ply. Also, the invention is not intended to be limited to tires having crossed cords on opposite sides of all of the interfaces in the tread area 13 but should be construed to include percentages less than 100 as long as the ratio of the percent of cross cord interfaces in the breaker or tread area to the percent of crossed cord interfaces in the sidewall flex area is greater than 1 and preferably at least 1.5.

While certain representative embodiments and details have been shown for the purpose of illustrating the invention, it will be apparent to those skilled in this art that various changes and modifications may be made therein without departing from the spirit or scope of the invention.

What is claimed is:

1. A bias ply pneumatic tire having a pair of beads, a carcass extending circumferentially of said tire and from bead to bead, a tread portion disposed circumferentially about said carcass, and means including said carcass providing a pair of sidewall portions each having a flex area, said carcass having cord reinforcing layers comprising bias carcass plies extending circumferentially of said tire and from bead to bead and at least one breaker ply extending circumferentially of said tire and disposed beneath said tread, said reinforcing layers being arranged such that the ratio of the percent of interfaces between reinforcing layers in the breaker area that have cords crossed on opposite sides thereof to the percent of interfaces between the reinforcing layers in the flex areas that have cords crossed on opposite sides thereof is at least 1.5.

2. A tire as claimed in claim 1 wherein all of said breaker plies are disposed between said carcass plies.

3. A tire as claimed in claim 1 wherein there are a plurality of breaker plies and at least one said breaker ply is located radially inwardly of the radially outermost carcass ply.

4. A tire as claimed in claim 3 wherein not more than one breaker ply is located between any two carcass plies.

5. A tire as claimed in claim 1 wherein all of the interfaces between reinforcing layers in the breaker area have cords crossed on opposite sides thereof.

6. A tire as claimed in claim 1 wherein the alternate interfaces between the reinforcing layers in said flex areas have cords crossed on opposite sides thereof, the remaining interfaces between reinforcing layers in said flex area have their cords parallel on opposite sides thereof and a breaker ply is located between each two carcass plies which have their cords parallel.

7. A tire as claimed in claim 2 wherein not more than one breaker is located between any two plies.

8. A tire as claimed in claim 7 wherein all interfaces between reinforcing layers in the tread area have cords crossed on opposite sides thereof.

* * * * *

PO-1050
(5/69)

UNITED STATES PATENT OFFICE
CERTIFICATE OF CORRECTION

Patent No. 3,685,564      Dated August 22, 1972

Inventor(s) John C Smithkey, Jr

It is certified that error appears in the above-identified patent and that said Letters Patent are hereby corrected as shown below:

Column 1, line 49, after "outside" insert -- side --.

Column 4, line 34, "hose" should be "those".

Column 6, line 51, "cross" should be "crossed".

Signed and sealed this 24th day of April 1973.

(SEAL)
Attest:

EDWARD M. FLETCHER, JR.            ROBERT GOTTSCHALK
Attesting Officer                  Commissioner of Patents